US 8,920,038 B2

(12) United States Patent
Varnoux et al.

(10) Patent No.: US 8,920,038 B2
(45) Date of Patent: Dec. 30, 2014

(54) CAGE FOR A ROLLING BEARING, NOTABLY FOR A MOTOR VEHICLE ELECTRIC POWER STEERING BEARING

(71) Applicant: Aktiebolaget SKF, Göteborg (SE)

(72) Inventors: Laurent Varnoux, Saint Avertin (FR); Thierry Adane, Tours (FR); Thomas Perrotin, Saint Roch (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 14/052,914

(22) Filed: Oct. 14, 2013

(65) Prior Publication Data

US 2014/0105531 A1    Apr. 17, 2014

(30) Foreign Application Priority Data

Oct. 12, 2012   (FR) .................................. 12 59732

(51) Int. Cl.
*F16C 33/38* (2006.01)
*F16C 33/41* (2006.01)
*F16C 33/46* (2006.01)

(52) U.S. Cl.
CPC ........... *F16C 33/3887* (2013.01); *F16C 33/416* (2013.01); *F16C 33/418* (2013.01); *F16C 33/467* (2013.01); *F16C 2326/24* (2013.01)
USPC .......................................... 384/523; 384/531

(58) Field of Classification Search
CPC .. F16C 33/3887; F16C 33/418; F16C 33/467; F16C 33/4676; F16C 33/541
USPC .................. 384/523, 531–534, 570, 573–578
See application file for complete search history.

(56) References Cited

U.S. PATENT DOCUMENTS 6,651,340 B2    11/2003   Prater

FOREIGN PATENT DOCUMENTS

| DE | 3644270 A1 | 7/1987 |
|---|---|---|
| DE | 102006015547 A1 | 10/2006 |
| DE | 102007034091 A1 | 1/2009 |
| DE | 102009024988 A1 | 12/2010 |
| DE | 102010033823 A1 | 2/2011 |
| DE | 102010021725 A1 | 12/2011 |
| DE | 102010029767 A1 | 12/2011 |
| EP | 0433725 A1 | 6/1991 |
| EP | 1070866 A1 | 1/2001 |
| FR | 2633679 A1 | 1/1990 |
| FR | 2911934 A1 | 8/2008 |
| JP | 2005325884 A * | 11/2005 |

* cited by examiner

*Primary Examiner* — Phillip A Johnson
(74) *Attorney, Agent, or Firm* — Bryan Peckjian; SKF USA Inc. Patent Department

(57) ABSTRACT

A cage for a rolling bearing which cage is intended to ensure the circumferential spacing of a row of rolling elements and comprises first pockets 28 for first rolling elements of the row, which pockets are provided with axial retention means 38, 46 for the axial retention of the cage onto the said rolling elements, and second pockets 26 for the second rolling elements of the row, which pockets have no axial retention means for retaining the cage on the said rolling elements. The distribution of the first pockets 28 about the periphery of the cage is uneven.

11 Claims, 3 Drawing Sheets

CAGE FOR A ROLLING BEARING, NOTABLY FOR A MOTOR VEHICLE ELECTRIC POWER STEERING BEARING

CROSS-REFERENCE

This application claims priority to French patent application no. 1259732 filed on Oct. 12, 2012, the contents of which are incorporated herein by reference.

TECHNICAL FIELD

The present invention relates to the field of rolling bearings, notably the rolling bearings used in motor vehicle electric power steerings. More specifically, the invention relates to the retention cages which ensure a circumferential spacing between the rolling elements of the rolling bearings.

RELATED ART

A motor vehicle electric power steering generally comprises an electromechanical actuator situated on the steering column or on the lower assembly which comprises mechanical components intended to ensure the angular positioning of the steered wheels of the vehicle. The electromechanical actuator comprises a rotary electric motor the shaft of which is supported by at least one rolling bearing, either directly or via a ball-screw system.

The rolling bearing generally comprises an inner ring, an outer ring and a row of rolling elements, generally balls, arranged between the rings.

A retaining cage for a rolling bearing comprising a plurality of pockets to house the balls and each of which is defined in part by two claws arranged opposite a heel of said cage is known, from document FR-A1-2 911 934. Such cages are entirely satisfactory in many applications. However, in application involving a low rotational speed or in applications in which the direction of rotation reverses sharply, this kind of cage runs into various difficulties. Specifically, under the effect of the balls, the cage may suffer extensive deformation and come into contact with the inner ring, causing it to become damaged or even destroyed.

In addition, when the direction in which load is applied to the rolling bearing changes, as it does for example when the wheels of a vehicle equipped with an electric power steering as described above are turned as the driver manoeuvres to the left and to the right when parking the vehicle, the cage is likewise severely deformed, or even destroyed. Moreover, it may prove difficult to fit such a cage over the balls.

Cages for rolling bearings and comprising first pockets for the balls and provided with axial retention claws for retaining the cage on the balls and second pockets not provided with axial retention claws are also known. The first and second pockets are distributed alternately in the circumferential direction in order to afford even axial retention of the cage on the balls.

However, in certain applications referred to as quarter-turn applications, in which the rolling bearing does not turn but oscillates, such a cage experiences heavy axial and radial loading in an angular sector referred to as the loading sector. In this zone, the cage does not offer the rolling elements sufficient freedom to move, and this leads to severe local cage deformation.

The present invention seeks to overcome this disadvantage.

SUMMARY

More specifically, the present invention seeks to provide a cage for a rolling bearing that is suited to a quarter-turn application and offers good reliability.

In one embodiment, the cage for a rolling bearing which cage is intended to ensure the circumferential spacing of a row of rolling elements comprises first pockets for first rolling elements of the row, which pockets are provided with axial retention means for the axial retention of the cage onto the said rolling elements, and second pockets for the second rolling elements of the row, which pockets have no axial retention means for retaining the cage on said rolling elements. The distribution of the first pockets about the periphery of the cage is uneven.

In one embodiment, the cage comprises at least two pairs of first pockets, the pockets of each pair being adjacent, and at least one additional first pocket which is spaced in the circumferential direction away from said pairs of at least one second pocket. The circumferential spacing between the pairs of first pockets may be greater than the circumferential spacing between one of said pairs and the additional pocket. For preference, the circumferential spacing between one of the pairs of first pockets and the additional first pocket is equal to the circumferential spacing between the other pair of first pockets and the said additional pocket.

In one embodiment, the cage comprises an annular heel and separation portions extending from the said heel and delimiting between them the first and second pockets.

The cage may comprise a first group of separation portions each one comprising at least one claw extending in the circumferential direction and forming the axial retention means, and a second group of separation portions which do not have claws. Advantageously, the said first group comprises separation portions each comprising two claws extending in the circumferential direction one towards the other, and hybrid separation portions each one comprising a single claw and a cylindrical protrusion. Each separation portion of the said first group may comprise a recess formed in the thickness of the said separation portion and open axially on the opposite side to the pockets. In one embodiment, the recess in each separation portion opens into the recess of the adjacent separation portion. The cage may for example be made as a single piece from a synthetic material, preferably a polymer.

According to a second aspect, the invention relates to a rolling bearing comprising an inner ring, an outer ring, at least one row of rolling elements arranged between the rings, and a cage as defined hereinabove.

According to a third aspect, the invention relates to a motor vehicle electric power steering comprising at least one rolling bearing as defined hereinabove.

BRIEF DESCRIPTION OF THE DRAWINGS

The present invention will be better understood from reading the detailed description of some embodiments which are given by way of entirely nonlimiting examples and illustrated by the attached drawings in which.

DETAILED DESCRIPTION OF THE INVENTION

Figure 1:
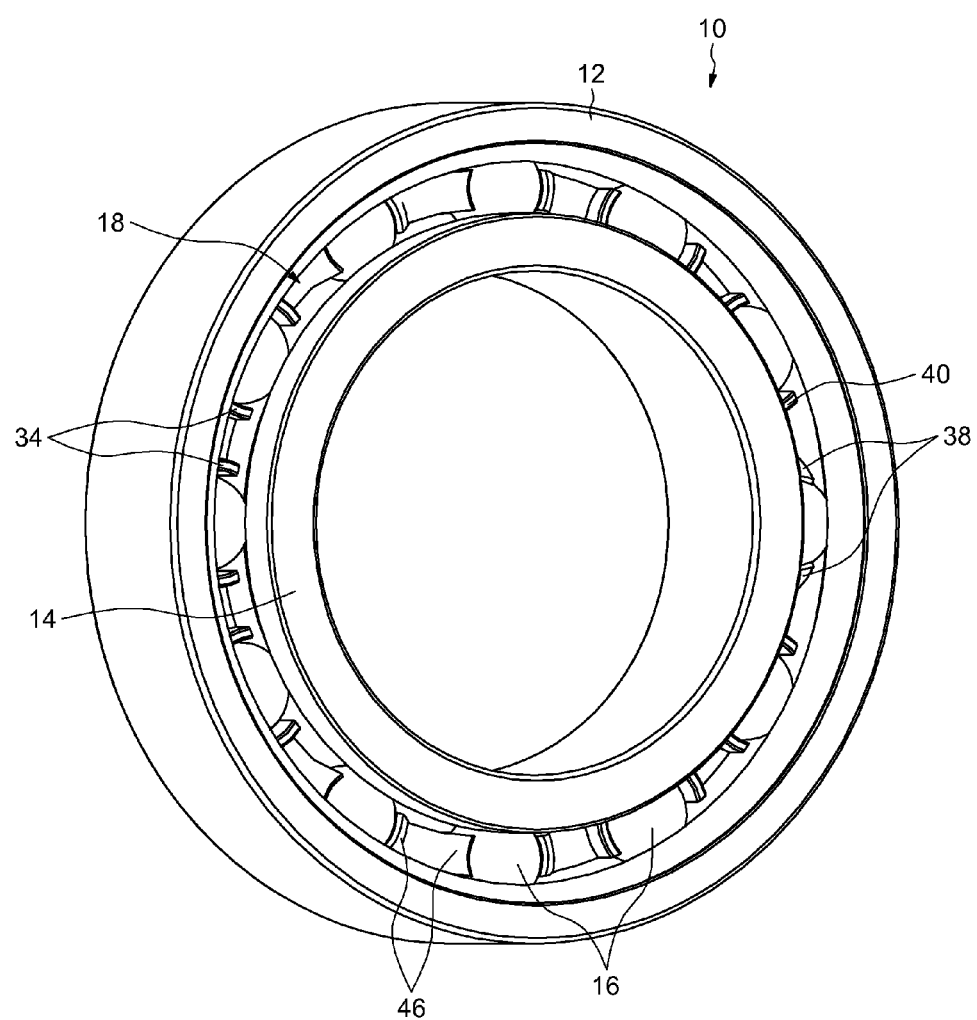
FIG. 1 is a perspective view of a rolling bearing according to a first embodiment of the invention.

As can be seen in FIG. 1, the rolling bearing 10 comprises an outer ring 12, an inner ring 14, a plurality of rolling elements 16, here produced in the form of balls, and a cage 18 that maintains an even circumferential spacing of the rolling elements. The outer ring 12 and inner ring 14 are solid. What is meant by a "solid ring" is a ring the shape of which is obtained by machining with the removal of chips (turning, grinding) from tubes, bar stock, forged and/or rolled blanks.

The outer ring 12 comprises, in the region of its bore, a deep groove raceway which, in cross section, has a concave internal profile tailored to the rolling elements 16, the said raceway facing radially inwards. The inner ring 14 likewise comprises, in its cylindrical exterior surface, a deep groove raceway which, in cross section, has a concave internal profile tailored to the rolling element 16, the said raceway facing radially outwards. The cage 18 is arranged radially between the outer surface of the inner ring 14 and the bore of the outer ring 12.

Figure 2:
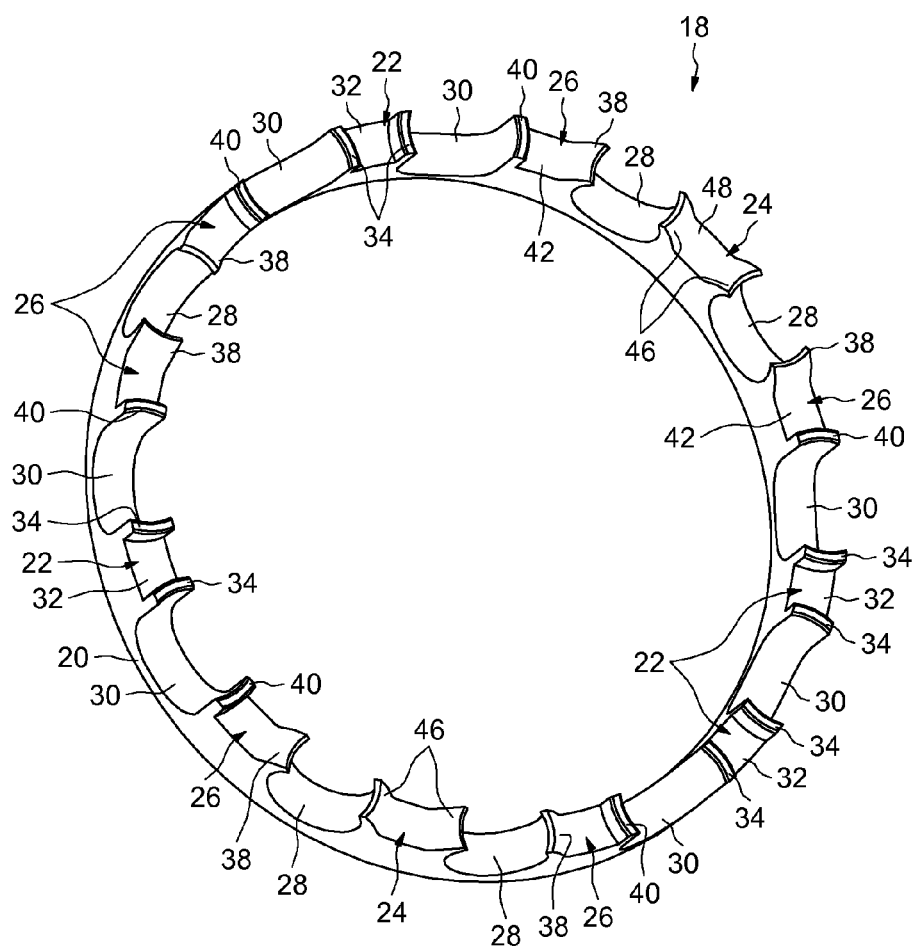
FIGS. 2 and 3 are perspective views of the cage of the bearing of FIG. 1.
Figure 3:
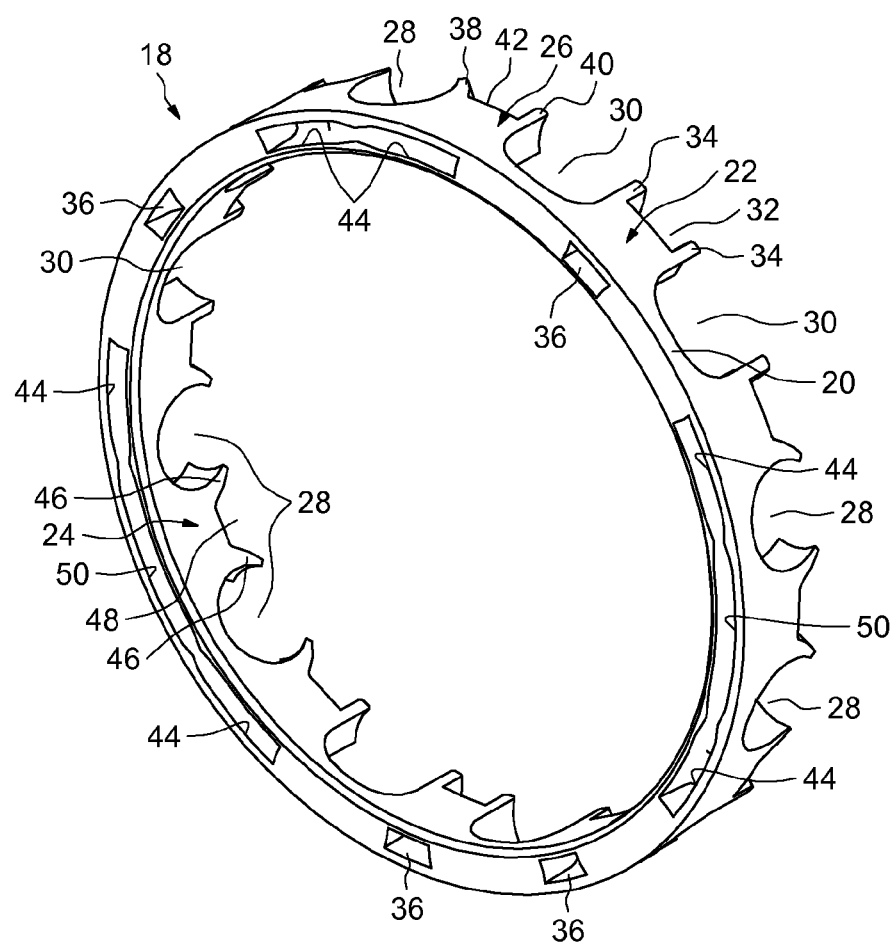

As illustrated more visibly in FIGS. 2 and 3, the cage 18 comprises an annular axial portion 20 designed to be arranged axially on one side of the rolling elements and forming a heel, and first and second separation portions 22, 24 or separation fingers, and hybrid separation portions 26 extending axially from the axial portion 20 on the opposite side to a radial end face 20a of the said portion. The separation portions 22 to 26 are of one piece with the axial portion 20 and between them delimit first and second pockets 28, 30 in which the rolling elements are arranged as will be described in greater detail later.

The first separation portions 22 take the form of pegs projecting axially from the axial portion 20, the said portions being delimited radially by an inner surface aligned with the bore of the axial portion 20 and by an outer surface aligned with the outer surface of the said axial portion. The separation portions 22 are delimited in the circumferential direction by substantially cylindrical lateral walls which define the pockets 30, at least in part. The diameter of the cylinder defining the walls of each pocket 30 is greater than that of the rolling elements so that the said rolling elements can be offered some clearance to move radially and circumferentially with respect to the pockets 30. Each pocket 30 is open radially towards the inside and towards the outside and is open axially on the opposite side to the axial portion 20 so as to allow the cage 18 to be fitted. The pockets 30 have an axial opening provided with cylindrical walls or edges so as to reduce the friction of the rolling elements rubbing against the cage.

Each separation portion 22 comprises a notch 32 formed at its free end and open axially on the opposite side to the axial portion 20. The notches 32 open radially towards the inside and towards the outside of the cage. Each notch 32 delimits on the associated separation portion 22 two axial protrusions 34 of substantially cylindrical shape which are situated axially on the opposite side from the axial portion 20 and which axially extend the lateral walls of the said separation portion. The protrusions 34 are not suitable for providing axial retention of the cage on the rolling elements. The pockets 30 are not provided with such axial retention means.

Each separation portion 22 comprises a recess 36 formed in the thickness of the said portion and extending from the end face 20a of the heel into close proximity with the notch 32. Each recess 36 is open axially on the opposite side to the pockets 26, 28 towards the end face 20a and is radially delimited by the inner and outer surfaces of the associated separation portion.

The second separation portions 24 and the hybrid separation portions 26 define the pockets 28 that are provided with axial retention means for retaining the said cage on the rolling elements. The pockets 28 have a spherical overall shape tending to envelop the associated rolling elements. Each hybrid separation portion 26 defines with the adjacent first separation portion 22 a pocket 30. In the embodiment illustrated, the cage 18 comprises six hybrid separation portions 30 two of which define one of the pockets 28 and four of which, paired with the separation portions 24, define four other pockets 28.

The first and second separation portions 22, 24 are respectively four and two in number, and there are seven pockets 26.

The pockets 28 are spaced apart unevenly in the circumferential direction. The circumferential spacing between two successive pockets 28 is not constant over the periphery of the cage. In the embodiment illustrated, the cage 18 comprises four pockets 28 arranged in pairs, the pockets of each pair being immediately adjacent, and a fifth pocket 28 spaced from each pair by two successive pockets 30. Three pockets 30 are provided between the two pairs of pockets 28. The fifth pocket 28 is formed by two adjacent hybrid separation portions 26 and the other four pockets 28 are each formed by a hybrid separation portion 26 and a second separation portion 24 which are adjacent. Six of the seven pockets 30 are each defined by a hybrid separation portion 26 and an adjacent first separation portion 22, the seventh pocket 30 being defined by two adjacent separation portions 22.

The hybrid separation portions 26 take the form of fingers or pegs projecting axially from the axial portion 20 and are radially delimited by inner and outer surfaces aligned respectively with the bore and with the outer surface of the said axial portion 20. Each hybrid separation portion 26 has, on one side in the circumferential direction, a side wall that is substantially cylindrical so that with an adjacent separation portion 22 it forms one of the pockets 30, and on the other side has a wall that is spherical connecting to the spherical wall of the adjacent hybrid separation portion 26 in order to form the pocket 28 adjacent to the said pocket 30.

Each hybrid separation portion 26 comprises a claw 38 extending axially on the opposite side to the axial portion 20 and the free end of which extends in the circumferential direction in order to delimit the associated pocket 28. In the case of the pocket 28 formed by the two adjacent hybrid separation portions 26, the claw 38 of one of the separation portions extends towards the claw opposite belonging to the other separation portion in order to delimit the said pocket 28. The concave inner surface of each claw 38 forms part of the spherical wall of the pocket 28. The free ends of the two claws 38 are spaced apart by a distance that is smaller than the diameter of the associated rolling element. The claws 38 of the said pocket 28 are capable of retaining the cage 18 axially by clipping onto the rolling element arranged in the said pocket. The cage 18 is retained axially on the row of rolling elements partly by the claws 38.

Each hybrid separation portion 26 also comprises an axial protrusion 40 of cylindrical shape extending axially in the opposite direction to the axial portion 20. The protrusion 40 of each hybrid separation portion 26 delimits, in part, with the protrusion 34 of the adjacent separation portion 22, one of the pockets 30 that is not provided with axial retention means. Each protrusion 40 is unable to provide axial retention of the cage with respect to the rolling element arranged in the pocket 30 adjacent to the pocket 28.

The claw 38 and the protrusion 40 of each hybrid separation portion 26 are separated in the circumferential direction by a cavity 42 so that the claw 38 has a relatively small circumferential thickness and a certain degree of flexibility allowing the cage 18 to be clipped onto the rolling element by circumferential parting of the claws 38 when axial thrust is applied to the axial portion 20 of the cage in the direction of the said rolling elements. Each pocket 28 is open radially towards the inside and towards the outside and is also open axially on the opposite side to the axial portion 20 so as to allow the cage 18 to be installed.

Each hybrid separation portion 26 further comprises a recess 44 formed in the thickness of the said portion and extending from the end face 20a of the heel into the vicinity of the notch 42. Each recess 44 is open axially on the opposite side to the pockets 26, 28 towards the end face 20a and is radially delimited by the inner and outer surfaces of the associated separation portion. In the case of the pocket 28 formed by the two adjacent hybrid separation portions 26, the recesses 44 open into one another in the circumferential direction.

The two separation portions 24 are in the form of fingers or pegs projecting axially with respect to the axial portion 20 and are radially delimited by inner and outer surfaces aligned respectively with the bore and with the outer surface of the said axial portion 20. Each separation portion 24 has, on each side in the circumferential direction, a spherical wall which connects to the spherical wall of the adjacent hybrid separation portion 26 to form the associated pocket 28.

Each separation portion 24 comprises two claws 46 extending axially on the opposite side to the axial portion 20, and identical to the claws 38 of the hybrid separation portions 26 and extending circumferentially in opposite directions. Each claw 46 extends in the direction of the claw 38 of the adjacent hybrid separation portion 26 to delimit the associated pocket 28. The free ends of the adjacent two claws 38, 46 are spaced apart by a distance smaller than the diameter of the associated rolling element. The claws 38, 46 of the said pocket 28 are capable of providing axial retention of the cage 18 by clipping onto the rolling element arranged in the said pocket. The cage 18 is retained axially on the row of rolling elements by the claws 38, 46. The claws 46 of each separation portion 24 are separated in the circumferential direction by a recess 48 such that they each have a relatively small circumferential thickness and a certain degree of flexibility that allows the cage 18 to be clipped onto the rolling elements.

Each separation portion 24 also comprises a recess 50 formed in the thickness of the said portion and extending from the end face 20a of the heel into the vicinity of the notch 48. Each recess 50 is open axially on the opposite side to the pockets 26, 28 towards the end face 20a and is delimited radially by the inner and outer surfaces of the associated separation portion. Each circumferential end of each recess 50 opens into the recess 44 of the adjacent hybrid separation portion 26.

The recesses 36, 44, 50 of the separation portions form, in the case 18, regions of local weakening of the mechanical strength of the said cage, encouraging it to flex. Furthermore, the recesses lighten the cage 18 by reducing the amount of material used. The cage 18 is advantageously made as a single piece by moulding a polymer material such as, for example, polyamide, notably PA 66 or PA 46, or alternatively a polyetheretherketone (PEEK).

Thanks to the uneven distribution in the circumferential direction of the pockets equipped with the retention means or means of clipper fastening onto the rolling elements, it is possible, notably in a quarter-turn application, to provide a cage orientation that is such that, in the most heavily loaded region of the bearing, the number of pockets equipped with retention means is limited so as to make the radial and circumferential movements of the rolling elements present in this region easier and avoid cage deformation.

The invention claimed is:

1. A cage for a rolling bearing that ensures the circumferential spacing of a row of rolling elements, the cage comprising:
first pockets for first rolling elements of the row, wherein the first pockets are provided with axial retention means for the axial retention of the cage onto the rolling elements, and
second pockets for the second rolling elements of the row, wherein the second pockets have no axial retention means for retaining the cage on the rolling elements, and wherein
the distribution of the first pockets about the periphery of the cage is uneven.

2. The cage according to claim 1, further comprising at least two pairs of first pockets, the first pockets of each pair being adjacent, and having at least one additional first pocket spaced in the circumferential direction away from the second pockets.

3. The cage according to claim 2, wherein the circumferential spacing between the pairs of first pockets is greater than the circumferential spacing between one of the pairs of first pockets and the additional first pocket.

4. The cage according to claim 3, wherein the circumferential spacing between one of the pairs of first pockets and the additional first pocket is equal to the circumferential spacing between the other pair of first pockets and the said additional pocket.

5. The cage according to claim 4, further comprising an annular heel and separation portions extending from the heel and delimiting between the first and second pockets.

6. The cage according to claim 5, further comprising a first group of separation portions each one having at least one claw extending in the circumferential direction and forming the axial retention means, and a second group of separation portions which do not include claws.

7. The cage according to claim 6, wherein the first group provides separation portions each including two claws extending in the circumferential direction one towards the other, and hybrid separation portions each one having a single claw and a cylindrical protrusion.

8. The cage according to claim 7, wherein each separation portion of the first group provides a recess formed in the thickness of the separation portion and open axially on the opposite side to the pockets.

9. The cage according to claim 8, wherein the recess in each separation portion opens into the recess of the adjacent separation portion.

10. A rolling bearing comprising:
an inner ring,
an outer ring,
at least one row of rolling elements arranged between the rings, and
a cage having first pockets for first rolling elements of the at least one row, wherein
the pockets are provided with axial retention means for the axial retention of the cage onto the rolling elements, and
second pockets for the second rolling elements of the row, wherein
the second pockets have no axial retention means for retaining the cage on the rolling elements, and wherein
the distribution of the first pockets about the periphery of the cage is uneven.

11. A motor vehicle electric power steering comprising:
at least one rolling bearing having an inner ring,
an outer ring,
at least one row of rolling elements arranged between the rings, and
a cage having first pockets for first rolling elements of the at least one row, wherein
the pockets are provided with axial retention means for the axial retention of the cage onto the rolling elements, and
second pockets for the second rolling elements of the row, wherein the second pockets have no axial retention means for retaining the cage on the rolling elements, and wherein the distribution of the first pockets about the periphery of the cage is uneven.

* * * * *